(12) United States Patent
Sinclair et al.

(10) Patent No.: US 9,055,607 B2
(45) Date of Patent: *Jun. 9, 2015

(54) DATA BUDDY

(75) Inventors: Michael J. Sinclair, Kirkland, WA (US);
Yuan Kong, Kirkland, WA (US);
Zhengyou Zhang, Bellevue, WA (US);
Behrooz Chitsaz, Bellevue, WA (US);
David W. Williams, Woodinville, WA (US); Silviu-Petru Cucerzan, Redmond, WA (US); Zicheng Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/323,570

(22) Filed: Nov. 26, 2008

(65) Prior Publication Data

US 2009/0075634 A1    Mar. 19, 2009

Related U.S. Application Data

(63) Continuation of application No. 11/170,545, filed on Jun. 29, 2005, now Pat. No. 7,460,884.

(51) Int. Cl.
*H04M 1/00*      (2006.01)
*H04W 88/06*    (2009.01)
(Continued)

(52) U.S. Cl.
CPC .......... *H04W 88/06* (2013.01); *H04M 1/72572* (2013.01); *H04M 2250/12* (2013.01); *H04M 2250/58* (2013.01); *H04W 8/245* (2013.01); *H04W 92/02* (2013.01); *H04W 92/10* (2013.01)

(58) Field of Classification Search
CPC .................. H04M 1/72522; H04M 1/72527; H04M 1/7253

USPC .......... 455/456.1, 414.1, 414.2, 550.1, 556.1
See application file for complete search history.

(56) References Cited

U.S. PATENT DOCUMENTS 4,428,057 A * 1/1984 Setliff et al. ................. 701/455
5,493,692 A     2/1996 Theimer et al.
(Continued)

FOREIGN PATENT DOCUMENTS

WO     9800787     1/1998

OTHER PUBLICATIONS

Andy Harter, et al., A Distributed Location System for the Active Office, IEEE Network, 1994, pp. 62-70.
(Continued)

*Primary Examiner* — Nghi H Ly
(74) *Attorney, Agent, or Firm* — Dan Choi; Judy Yee; Micky Minhas

(57) ABSTRACT

Multi-modal, multi-lingual devices can be employed to consolidate numerous items including, but not limited to, keys, remote controls, image capture devices, audio recorders, cellular telephone functionalities, location/direction detectors, health monitors, calendars, gaming devices, smart home inputs, pens, optical pointing devices or the like. For example, a corner of a cellular telephone can be used as an electronic pen. Moreover, the device can be used to snap multiple pictures stitching them together to create a panoramic image. A device can automate ignition of an automobile, initiate appliances, etc. based upon relative distance. The device can provide for near to eye capabilities for enhanced image viewing. Multiple cameras/sensors can be provided on a single device to provide for stereoscopic capabilities. The device can also provide assistance to blind, privacy, etc. by consolidating services.

20 Claims, 13 Drawing Sheets

(51) Int. Cl.
*H04M 1/725* (2006.01)
*H04W 8/24* (2009.01)
*H04W 92/02* (2009.01)
*H04W 92/10* (2009.01)

(56) References Cited

U.S. PATENT DOCUMENTS

| | | | |
|---|---|---|---|
| 5,544,321 | A | 8/1996 | Theimer et al. |
| 5,555,376 | A | 9/1996 | Theimer et al. |
| 5,570,134 | A * | 10/1996 | Hong .......................... 348/467 |
| 5,603,054 | A | 2/1997 | Theimer et al. |
| 5,611,050 | A | 3/1997 | Theimer et al. |
| 5,812,865 | A | 9/1998 | Theimer et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,747,675 | B1 | 6/2004 | Abbott et al. |
| 6,775,560 | B2 * | 8/2004 | King et al. .................... 455/566 |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,907,256 | B2 * | 6/2005 | Hokao ......................... 455/463 |
| 7,089,291 | B1 * | 8/2006 | Philyaw ....................... 709/217 |
| 7,337,212 | B2 * | 2/2008 | Goto ............................ 709/206 |
| 7,460,884 | B2 * | 12/2008 | Sinclair et al. ............. 455/556.1 |
| 2001/0029519 | A1 * | 10/2001 | Hallinan et al. ............. 709/104 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0019487 | A1 * | 1/2004 | Kleindienst et al. ........ 704/270.1 |
| 2004/0203629 | A1 * | 10/2004 | Dezonno et al. ........... 455/414.1 |
| 2005/0034078 | A1 | 2/2005 | Abbott et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

\* cited by examiner

DATA BUDDY

RELATED APPLICATIONS

This application is a continuation of U.S. Ser. No. 11/170,545, Filed Jun. 29, 2005, entitled "DATA BUDDY". The entirety of which are incorporated herein by reference.

BACKGROUND

Both enterprises and individuals are increasingly interested in using handheld devices. Most modern handheld devices are equipped with multiple sensors (e.g., microphone, wireless transmitter, global positioning system (GPS) engine, camera, stylus, etc.). However, there are no applications available that make full use of multiple sensors. In other words, multi-sensory technologies that make handheld devices a multi-modal multi-lingual mobile assistant are not available.

Today, cellular telephones running on state-of-the-art operating systems have increased computing power in hardware and increased features in software in relation to earlier technologies. For instance, cellular telephones are often equipped with built-in digital image capture devices (e.g., cameras) and microphones together with computing functionalities of personal digital assistants (PDAs). Since these devices combine the functionality of cellular phones with the functionality of PDAs, they are commonly referred to as "smartphones."

The hardware and software features available in these smartphones and similar technologically capable devices provide developers the capability and flexibility to build applications through a versatile platform. The increasing market penetration of these portable devices (e.g., PDAs) inspires programmers to build applications, Internet browsers, etc. for these smart-phones. However, conventional devices cannot collaborate services employed within a single device thereby enhancing functionality.

The Internet continues to make available ever-increasing amounts of information which can be stored in databases and accessed therefrom. Additionally, with the proliferation of portable terminals (e.g., notebook computers, cellular telephones, PDAs, smartphones and other similar communication devices), users are becoming more mobile, and hence, trackable with respect to buying habits and locations that they tend to frequent. For example, many devices are being designed with a geographic location tracking technology such as GPS for reasons of safety, finding travel destinations, etc. Thus, it now becomes possible to determine the location of the user. This location can be valuable to augmenting services within a portable device.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system that facilitates multi-modal consolidation and/or collaboration of services. More particularly, aspects can collaborate and/or consolidate services thus pooling resources from one or more disparate services. Another aspect can pool resources from local services as well as remote services via an interface component.

In another aspect, a multi-modal multi-language portable communication device that can collaborate and/or consolidate resources of multiple services is provided. In accordance therewith, the multi-modal multi-language portable communication device can pool resources from multiple internal and/or external services. Additionally, the multi-modal multi-language portable communication device can facilitate converting and/or translating a service input and/or output thus effecting comprehendible communications via the device. In still another aspect, a location detection component can be provided to assist in determining an appropriate language in relation to a current and/or inferred target location.

Still another aspect is directed to a multi-modal multi-lingual mobile device that facilitates consolidation of numerous items including, but not limited to keys, remote controls, image capture devices (e.g., cameras), audio (e.g., voice, music) recorder, cellular telephone functionalities, compasses, global position systems (GPSs), health monitors, calendars, gaming devices, smart home inputs, electronic pens, optical navigational devices (e.g., pointing devices, mice). For example, an aspect is directed to a multi-modal multi-lingual communication device whereby a corner of a device can be used as an electronic pen.

Yet another aspect is directed to a multi-modal multi-lingual mobile device that can be used to capture multiple images and stitch the images together thus creating a panoramic image. Another example is directed to a multi-modal multi-lingual mobile device that, when GPS enabled, can be employed to start a vehicle engine, initiate or turn on an appliance, etc. based at least in part upon a relative distance from the vehicle, appliance, etc. In other words, an aspect can be employed to start a vehicle engine, turn on an appliance, etc. as a user approaches the vehicle, appliance, etc.

In another aspect, a multi-modal multi-lingual mobile device can provide for near to eye capabilities thus effecting enhanced image viewing. Other aspects employ multiple image capture devices and/or sensors on a single multi-modal multi-lingual mobile device thereby providing for stereoscopic capabilities. Still other multi-modal multi-lingual mobile devices can employ ambient intelligence, directional speech transmission, range/bone sensors, etc. in connection with providing a wide range of functionalities (e.g., assistance to blind, privacy, consolidation of personal items, . . . ). Yet another aspect provides for a multi-modal multi-lingual mobile device that can employ a three-dimensional (3D) screen that augments screen real estate functionalities and the like.

A multi-language component can be provided that facilitates comprehendible communication. For example, the multi-language component can translate text and/or voice communication of a service into a language comprehendible by a user. As well, the multi-language component can be employed to translate services into a language (or dialect) that corresponds to the current (or destination) location. Moreover, aspects employ the multi-language component to translate any desired communication into any desired language and/or dialect.

In yet another aspect thereof, an AI component is provided that employs a probabilistic and/or statistical-based analysis to prognose or infer an action that a user desires to be automatically performed. In one aspect, the AI reasoning and/or learning logic can be provided to facilitate inferring and/or predicting a location of a user and/or device. Rules-based logic can also be provided in addition to or in place of the AI component. The rules-based logic component can facilitate automating functionality in accordance with a predefined or preprogrammed rule.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
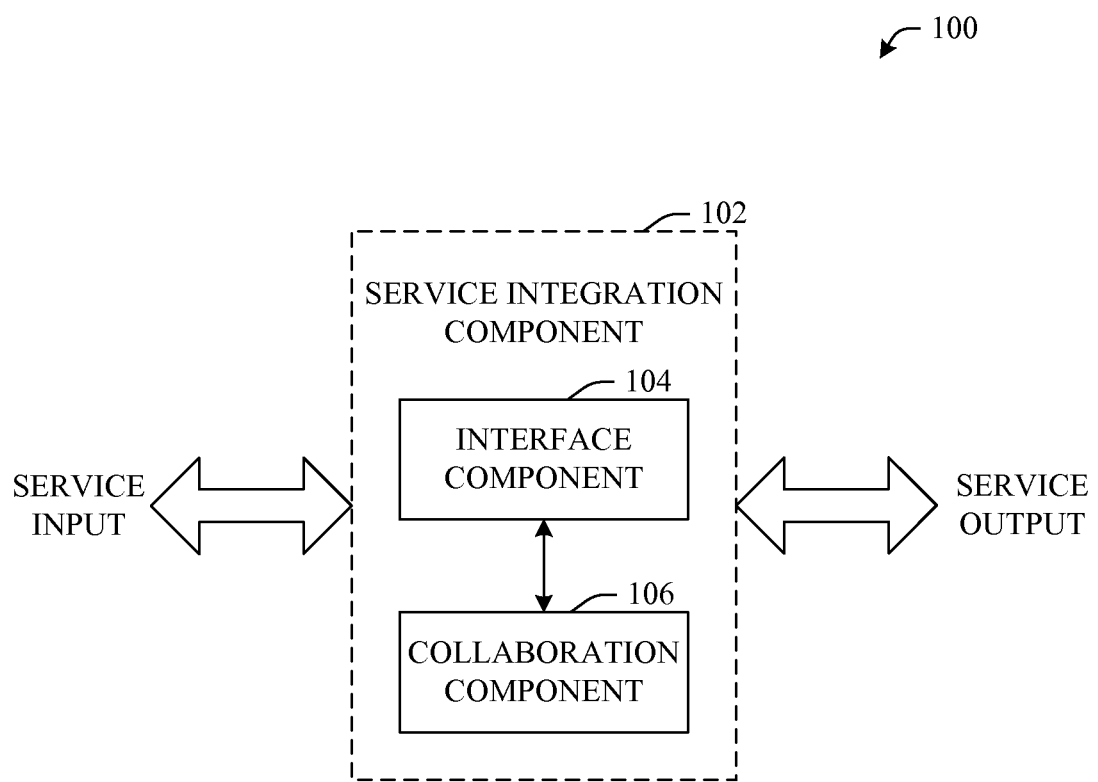
FIG. 1 illustrates a system that facilitates consolidating multiple services in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates integrating multiple services in accordance with an aspect. Generally, system 100 can include a service input, a service integration component 102 and a service output as shown. In operation, service integration component 102 can receive multiple service inputs that correspond to particular services. These inputs can be processed by the service integration component 102 thus facilitating a rendering a consolidated service output.

The service integration component 102 can include an interface component 104 and a collaboration component 106. In one aspect, the interface component 104 can facilitate receipt of a service input from one or more disparate services. The interface component 104 can facilitate interaction of the service inputs with a host device (e.g., multi-modal multi-lingual mobile device, cellular telephone, . . . )

A collaboration component 106 can be provided to pool resources from all or a subset of the input services. Accordingly, the collaboration component 106 can facilitate one or more of the disparate services. The following scenario is provided to add context to the invention. It is to be appreciated that this example is provided merely as an example and is not intended to limit the scope of the functionality and/or claims appended hereto in any way. Other scenarios that exist and may become apparent to those skilled in the art are intended to be included within the scope of this disclosure and claims appended hereto.

Suppose a first service is a location detection engine (e.g., global positioning system (GPS)) and a second service is a personal information manager (PIM). The service integration component 102 can receive inputs from each of these services. Accordingly, the interface component 104 can communicate bi-directionally with the services thereby effecting interaction of the services with a host device (e.g., cellular telephone).

Continuing with the example, the collaboration component 106 can pool resources from each of the disparate services thereby providing additional functionality to the host device.

By way of example, the collaboration component 106 can effect employing the GPS service together with the PIM service to render location-based information. For instance, contact lists maintained in a PIM can be truncated and/or sorted in accordance to a predefined radius surrounding a current location defined by the GPS service. It is to be appreciated that countless examples can exist that employ the novel functionality of the subject innovation. These alternative examples are intended to be included within the scope of this disclosure and claims appended hereto.

In another aspect, suppose that a user intends to purchase a headset. Further, suppose that the user receives a catalog which has a set of headset collections available from a particular store. In accordance with the novel functionality described herein, the user can employ a first service via a suitably equipped portable device to capture an image of the catalog page that illustrates the desired product. As well, a second service, e.g. voice recognition functionality, can be employed to correct or augment interpretation or recognition of the image. In one example, the catalog listing contains both telephone number and address information of the store.

Accordingly, the interface component 104 can affect interaction of the services into the portable device. The collaboration component 106 can be employed to poll resources from the disparate services. In other words, the collaboration component 106 can be employed to enable the services to work together thereby providing enhanced functionality to the portable device.

Referring again to the example, once the image is scanned and analyzed, the user can instruct the device to "call the store." Thus, the phone communication can be automatically established. In another example, if the callee does not speak the same language as the caller (e.g., user), the device can determine a native dialect either through location detection or phone number analysis. In other words, the device can employ location detection techniques to determine a current location of the phone thereby inferring the native spoken language. Accordingly, the multi-lingual functionality of the device can be employed to translate incoming and outgoing speech signals thereby effecting comprehendible communication. Again, this is an example of collaborating services (e.g., location detection and multi-lingual component) to provided enhanced functionality to the device.

Continuing with the example, the user can inquire to the receptionist when the store will close. Thus, a determination can be made if time permits to visit the store. This determination can be made consolidating two other disparate services. For instance, the determination can be made by automatically querying calendar appointments (e.g., PIM) with respect to the current time and distance to the store location (e.g., location detection). It will be appreciated that a distance to the store from the device location can be automatically calculated using satellite location detection, cellular triangulation or the like.

Upon an affirmative determination that time exists to visit the store, the novel functionality can automatically access directions to the store. Since the device can be wirelessly-connected to the Internet, the user can instruct (e.g., audibly) the device to contact a service provider thereby generating specific directions to the store. Again, the satellite positioning system can facilitate identification of the reference (e.g., current) location. This current location can be employed together with the target location (e.g., store address) in order to establish directions to the store.

With continued reference to the example, while in the store, the user sees a product called "WITTY Wireless Stereo Headset". In response thereto, the user can scan (or capture an image of) the product name and reads it at the same time in order to get accurate recognition. Again, the device, through a suitable wireless connection, can generate product reviews from the Internet or other network/server. Additionally, in accordance with the location detection system, the device can notify the user of nearby locations to purchase the same, or similar, product at a better price. It is to be understood that this scenario is provided to detail some of the novel service collaboration and consolidation functionalities described herein. It will be appreciated that other multi-modal, multi-lingual aspects exist and are to be included in the scope of this specification as well as the claims appended hereto.

Figure 2:
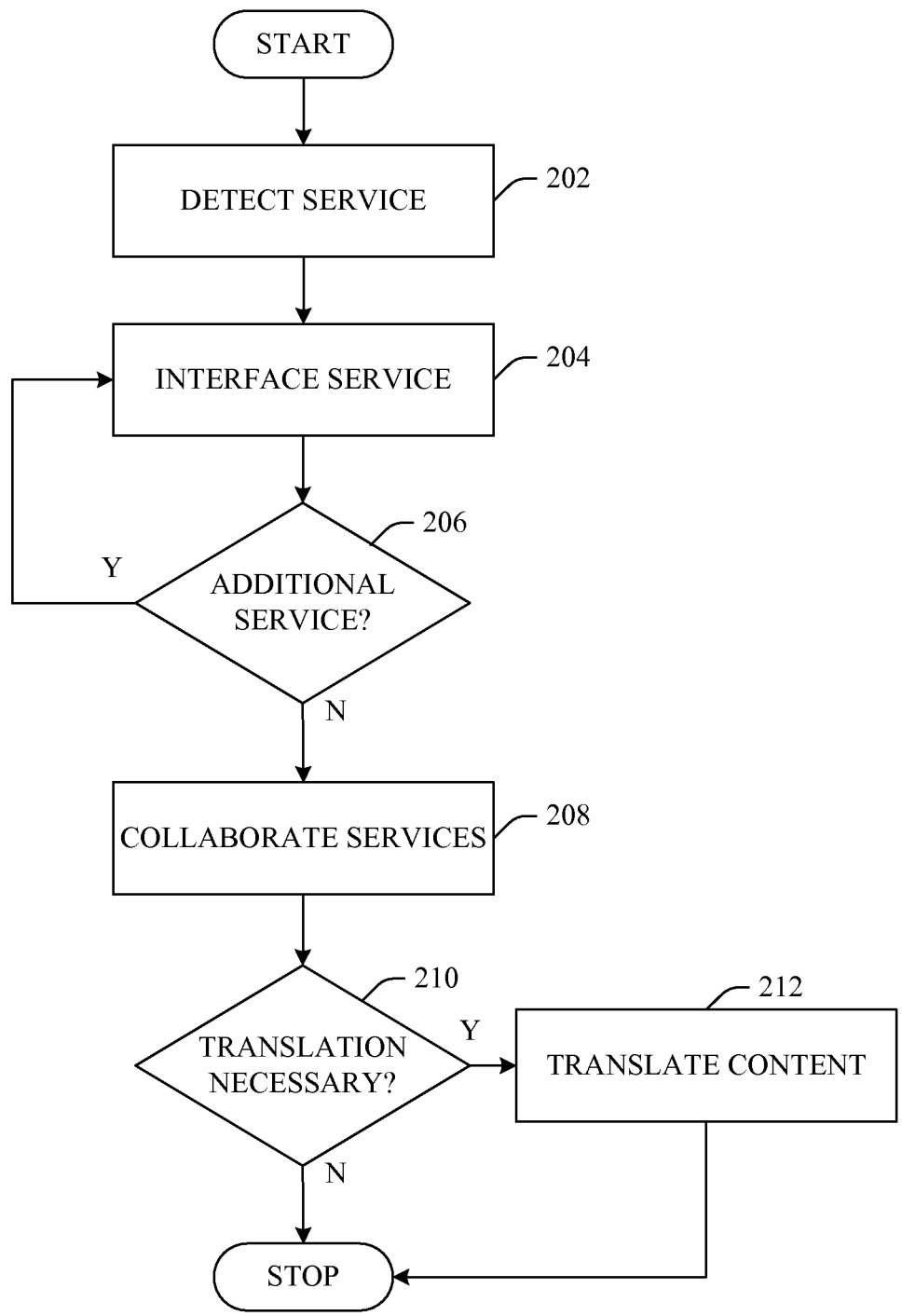
FIG. 2 illustrates an exemplary flow chart of procedures that facilitate collaborating services in accordance with an aspect of the invention.

FIG. 2 illustrates a procedure flow of collaborating and/or consolidating services in accordance with an aspect. While, for purposes of simplicity of explanation, the one or more methodologies shown herein, e.g. in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, a service is detected. It will be appreciated that detection of a service can be employ any suitable wired or wireless protocol. Once detected, at 204, the service is interfaced into the host device. Essentially, the service can be configured whereby enabling use of the service via the host device. Host devices can included, but are not limited to, cellular telephones, personal data assistants (PDAs), smart-phones, pocket computers, notebook and laptop computers or other portable devices.

At 206, a determination is made if an additional service is available to be interfaced into the host device. If an additional service is available, the system returns to 204 thus interfacing the additional service. Once all services are interfaced, the services are collaborated at 208. In collaborating services, disparate resources can be pooled thus establishing functionality that draws upon multiple services. For example, a location detection system can be employed to determine the location of a host device. This location can be communicated to a smart home component whereas home appliances can be controlled based upon a location relative to the home. For instance, an oven can be automatically programmed to turn on when a user enters a predefined radius distance of a home.

It is to be appreciated that this distance can be determined based upon any criteria. In one aspect, the criteria can be programmed based upon a user defined rule. In another aspect, the criteria can be based upon an inference generated via an artificial intelligence (AI) engine. These rules-based and AI-based aspects will be described in greater detail with reference to FIGS. 9 and 10 below.

Once the services are collaborated, at 210, a determination is made if translation is necessary. For example, in scenarios that include speech transmission, translation may be necessary to effect comprehendible communications. If translation is necessary, the content is translated at 212. An intelligent translator can be employed thus determining a native dialect for a predetermined location. Accordingly, effective communication can be employed in scenarios that would otherwise encounter language barriers. Once translation is complete or if translation is not required (or desired) a stop block is reached.

Figure 3:
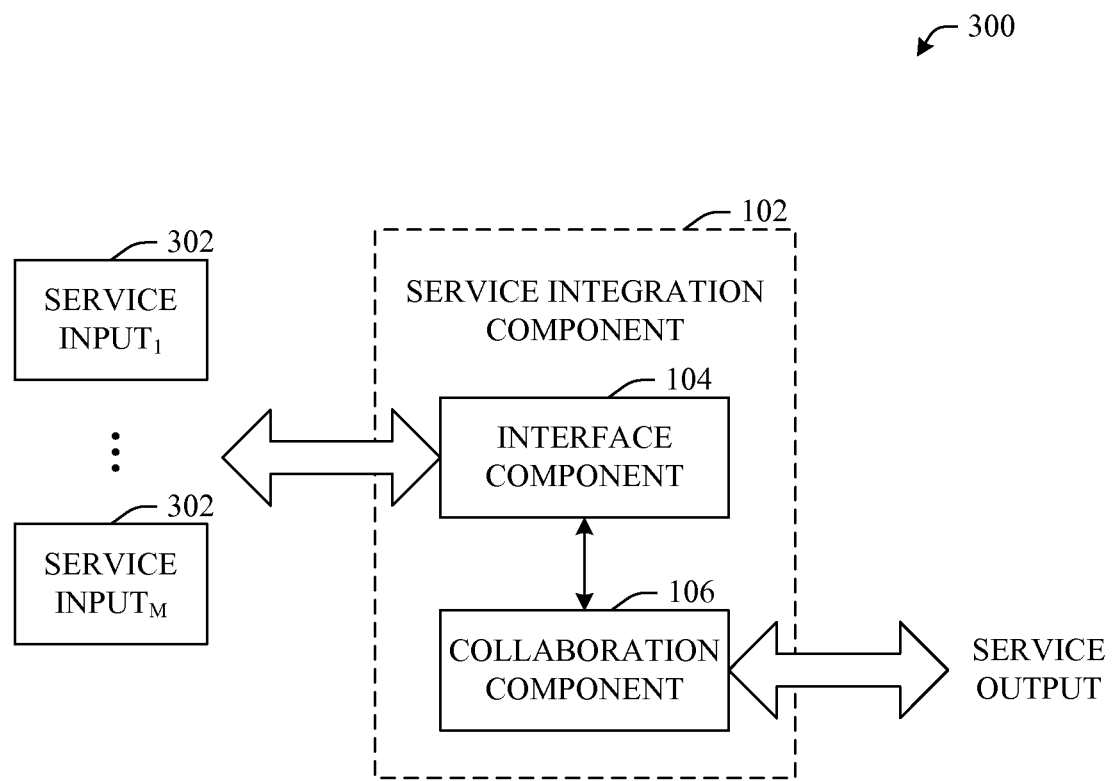
FIG. 3 illustrates a block diagram of a system that facilitates collaboration of multiple services in accordance with an aspect of the invention.

Referring now to FIG. 3, a system 300 that facilitates consolidating multiple services is shown. Generally, the system 300 can include a service integration component 102 capable of receiving multiple service inputs, interfacing the inputs and collaborating resources of the services. As described with reference to FIG. 1, the service integration component 102 can include an interface component 104 and a collaboration component 106. The interface component 104 and the collaboration component 106 can have the same or similar functionality as described with reference to FIG. 1.

As illustrated in FIG. 3, the service integration component 102, via the interface component 104, is capable of receiving multiple service inputs. More particularly, 1 to M service inputs can be received by the service integration component 102, where M is an integer. It is to be appreciated that the 1 to M service inputs can be referred to individually or collectively as service input 302. In operation, the interface component 104 can integrate the one or more service inputs 302 into a host system (e.g., 300) whereby the collaboration component 106 can pool resources from the disparate service inputs 302. Accordingly, a service output can be generated thus effecting the functionality of the pooled resources.

Figure 4:
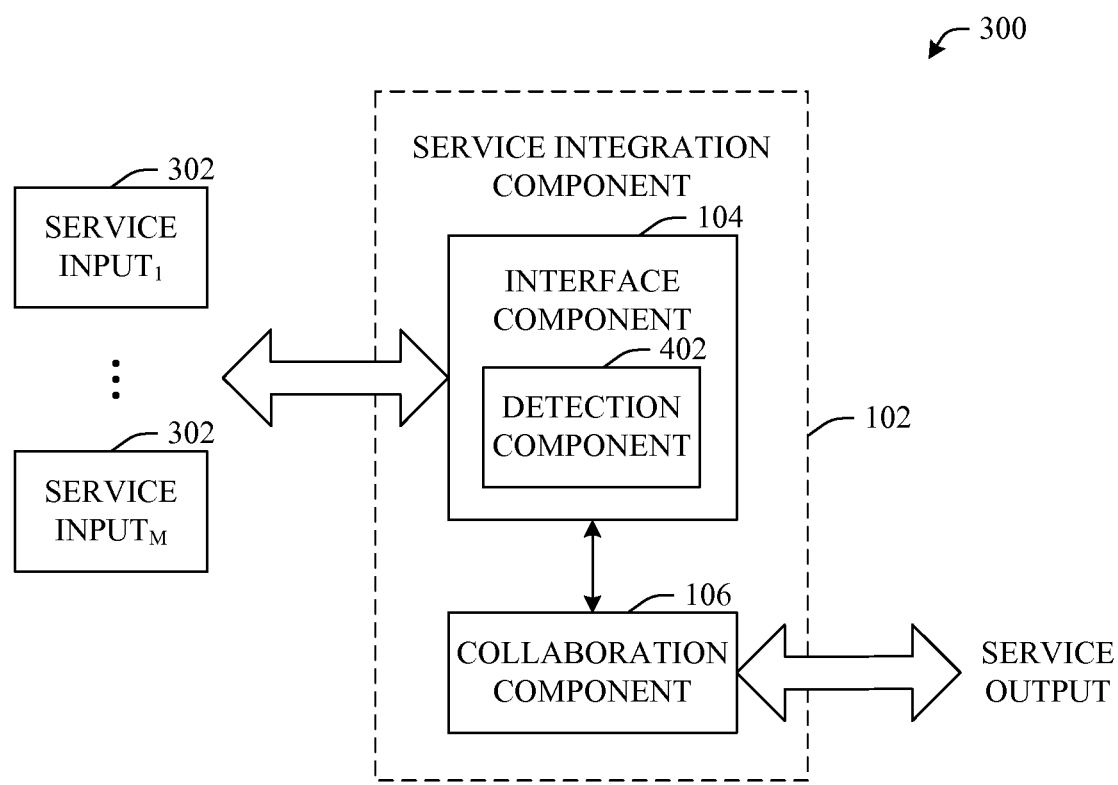
FIG. 4 illustrates a system that facilitates detecting and collaborating resources with respect to multiple services in accordance with an aspect of the invention.

Turning now to FIG. 4, an alternate block diagram of system 300 is shown. In particular, the alternate block diagram illustrated in FIG. 4 includes a detection component 402 that facilitate detection of the service inputs 302. For example, it is to be appreciated that the detection component 402 can facilitate detecting one or more remote services that can be integrated into a host device (e.g., cellular telephone).

As shown, the interface component 104 can include a detection component 402 that can initiate service (e.g., 302) integration. Detection component 402 can facilitate identifying when and/if a compatible service (e.g., 302) is within a wireless range of a host component (e.g. cellular telephone having an interface component 104). For example, in a Wi-Fi scenario, detection component 302 can facilitate monitoring (e.g., sensing) for compatible (e.g., IEEE 802.11g equipped) devices. It is to be appreciated that any wireless communication protocol can be employed in connection with the subject invention. By way of further example, but not limitation, other aspects can employ a disparate Wi-Fi protocol (e.g., 802.11b), Bluetooth™, Wi-Max, infrared protocol or the like without departing from the spirit and/or scope of this disclosure and claims appended hereto.

Figure 5:
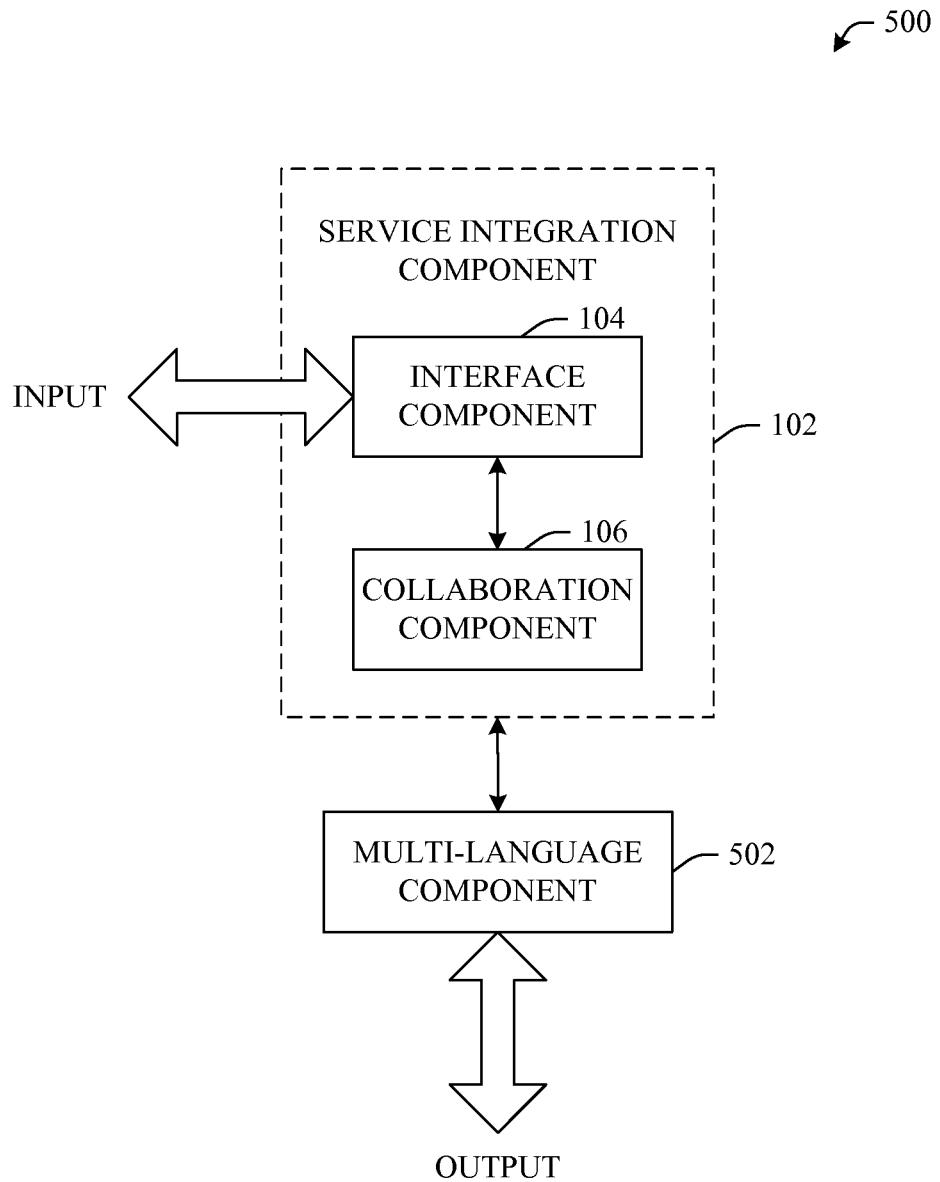
FIG. 5 illustrates a multi-language system that facilitates collaboration of multiple services in accordance with an aspect of the invention.

Referring to FIG. 5, a system 500 that facilitates utilization of a multi-language component 502 in connection with service consolidation in accordance with an aspect is shown. Essentially, the service integration component 102 of system 500 can include an interface component 104 and a collaboration component 106 as described with reference to FIG. 1 supra. Additionally, an optional multi-language (e.g., multilingual) component can be employed to translate and/or convert an output from the service integration component 102 into a language comprehendible to a user. It is to be understood that the novel functionality of the aspect is to include utilization of location detection mechanisms and services to determine the language comprehendible to the user. Moreover, it is to be appreciated that the multi-language component 502 can translate audible (e.g. speech) input thus effecting control of the service integration component 102 by any language.

By way of example, a GPS system or service can be employed to determine a relative location of the user and/or system 500. Accordingly, the multi-language component 502 can determine an appropriate language/dialect (or set of languages/dialects) thus translating the output of the service integration component 102 in order to effect comprehendible communication. It is to be appreciated that this language conversation can be employed in any of a speech-to-speech, speech-to-text, text-to-speech or text-to-text scenario.

Figure 6:
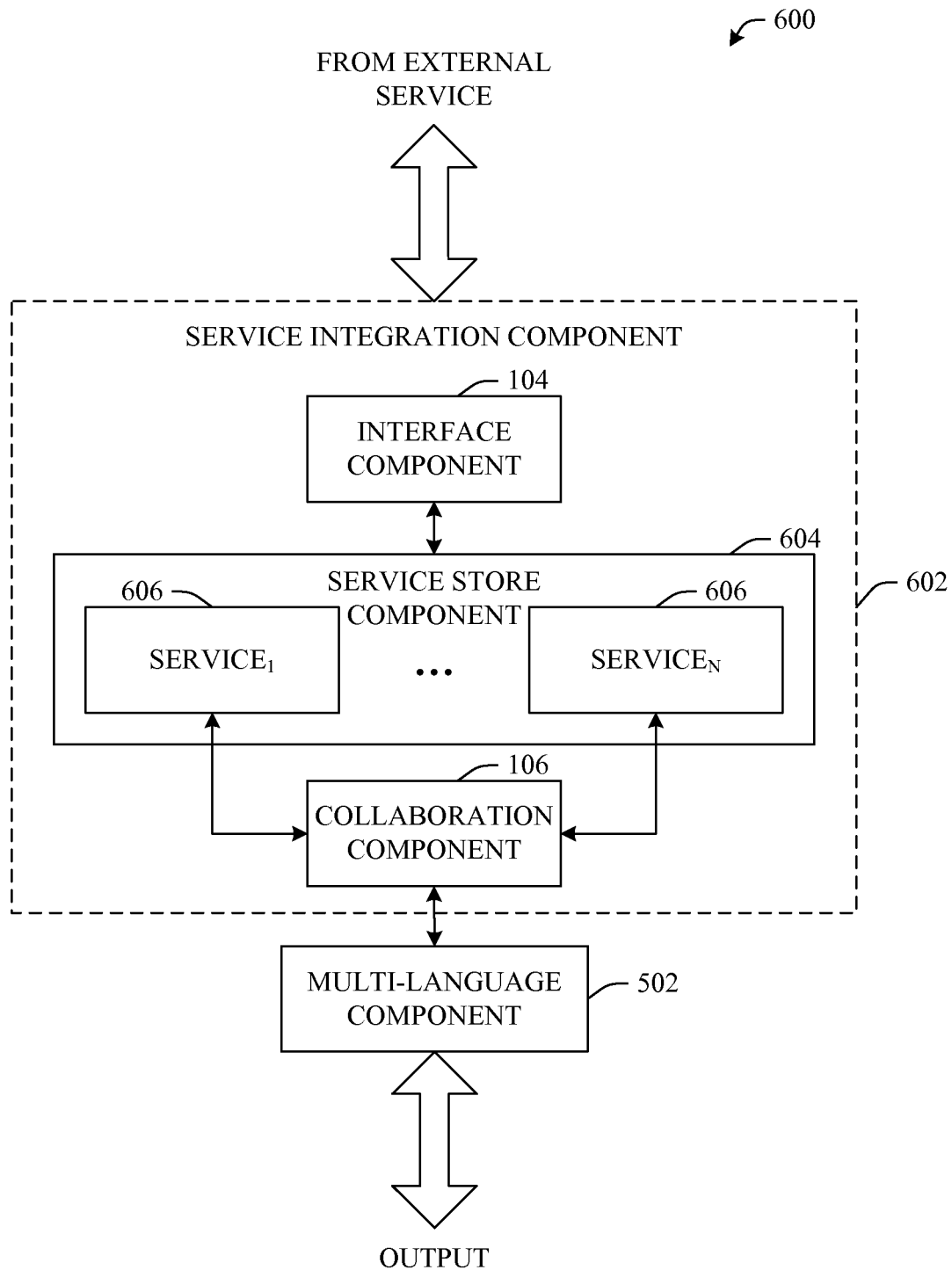
FIG. 6 is a schematic block diagram of a system that facilitates collaboration of multiple internal and/or external services in accordance with one aspect of the subject invention.

An alternative system 600 that facilitates service consolidation and/or collaboration is illustrated in FIG. 6. Generally, system 600 can include a service integration component 602 that is capable of receiving external (and internal) service input(s) as shown. Once the services are consolidated and/or collaborated, an output can be sent to the multi-language component 502 thus effecting conversion and/or translation as described with reference to FIG. 5 above.

The service integration component 602 can include an interface component 104, a collaboration component 106 and an integral service store component 604. Service store component 604 can include 1 to N on-board, integral services, where N is an integer. It is to be understood that 1 to N service components can be referred to individually or collectively as service component 606.

Effectively, system 600 illustrated in FIG. 6 can facilitate consolidating and/or collaborating resources from external service inputs (e.g., GPS) together with resources from internal service components 606. As such, enhanced functionality of the system 600 can be established. As stated supra, many modern handheld devices (e.g., cellular telephones, smart-phones, pocket computers, personal data assistants (PDAs)) are equipped with multiple sensors. For example, it is common for a portable device to include a microphone, wireless transmitter, GPS receiver, image capture device (e.g., camera, scanner), stylus, etc. In one aspect, because the invention employs a multi-language component 502, the functionality described herein can be particularly useful to international travelers to assist in communication in view of potential language barriers. For example, foreign travelers can employ the system 600 for translation of foreign signs and restaurant menus (via image capture device) as well as for asking non-English speakers for directions using English. It is to be appreciated that the invention can be employed to communicate using any native or base language and/or dialect. Other aspects can employ a scanner component that facilitates scanning an image and an image processing engine that recognizes a symbol in the image. The image processing engine can convert the symbol into a text file of a pre-defined format that facilitates interaction with the system or a user. It is to be understood that the symbol can be at least one of an alphabetical character, a numerical character, a bar code and a shape. Other examples of this enhanced functionality can be better understood with reference to FIG. 7 that follows.

Figure 7:
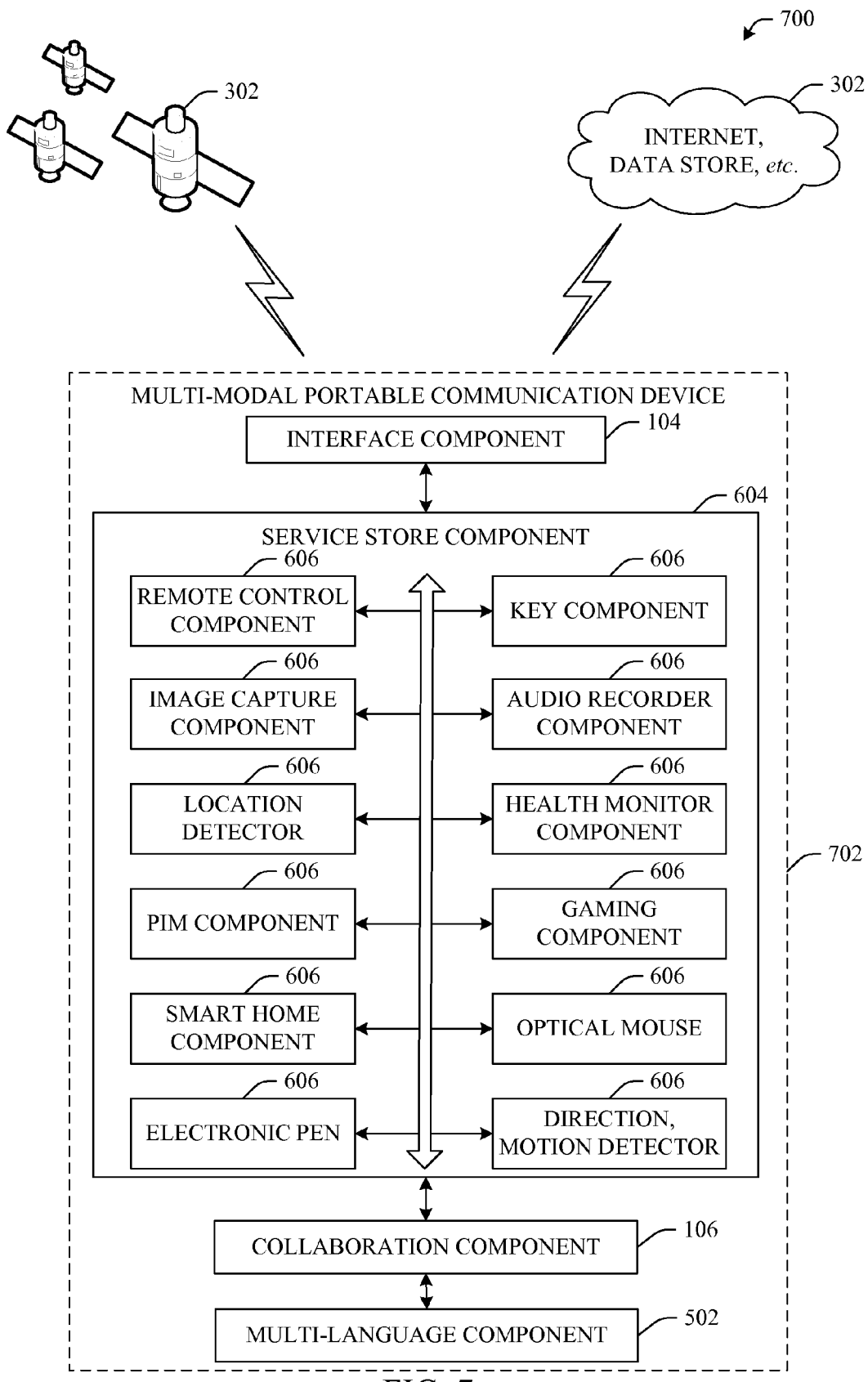
FIG. 7 illustrates a multi-modal portable communication device having multiple internal services and capable of consolidating services in accordance with an aspect of the invention.

FIG. 7 illustrates a system 700 that facilitates consolidating services in a mobile communication device. Generally, system 700 can include a multi-modal portable communication device 702 capable of consolidating internal and external service resources. The multi-modal portable communication device 702 can include an interface component 104 and a collaboration component 106.

As described supra, the interface component 104 can integrate one or more internal and/or external service components into the multi-modal portable communication device 702. In operation, interface component 104 can communicate with external services 302 and/or services 606 maintained in an integral service store component 604. Additionally, the interface component 104 can communicate with the collaboration component 106 thus effecting pooling resources from one or more service components (302, 606).

An optional multi-language component 502 can be employed to translate and/or convert a service output (or input) into a language comprehendible to a user or receiver of the service output. For example, a GPS system can be employed to determine a relevant location of the multi-modal portable communication device 702. This determined location can be employed to identify an appropriate language and/or dialect thus effecting comprehendible communications. It is to be appreciated that multi-modal communication device 702 can include, but is not limited to, a cellular telephone, PDA, smartphone, pocket computer, laptop computer or the like.

Following are a number of exemplary aspects that illustrate consolidation and/or collaboration of services. It is to be understood that these exemplary aspects are not intended to limit the invention in any way. Rather, these exemplary aspects are set forth to provide context of the invention for descriptive purposes only. These exemplary aspects are not intended to limit the invention in any way. It is to be understood that additional aspects exist and are to be included, together with the scenarios set forth herein, within the scope of this disclosure and claims appended hereto.

As set forth supra, a multi-modal portable communication device 702 can be employed to consolidate number services (e.g., 302, 606). For example, the multi-modal portable communication device 702 can be employed to consolidate service resources of keys, remote control units, image capture components, audio (e.g., voice, music) recorder components, location detectors, health monitors, PIMs, gaming components, smart home components, optical pointing devices (e.g., mouse), electronic pens or the like. It is to be understood that the aforementioned service list is not to be considered exhaustive. Rather, this list is to be considered exemplary and it should be understood that other service resources can be pooled into the multi-modal portable communication device 702 without departing from the spirit and scope of the disclosure and claims appended hereto.

In a more specific scenario, the multi-modal portable communication device 702 can be employed to capture multiple images via image capture component (e.g., camera, scanner) 606. Accordingly, a stitching component (not shown) could be employed to stitch the images together thus creating a panoramic image. These individual resources (e.g., image capture and stitching) can be consolidated through the functionality of the collaboration component 106 to effect generation of the panoramic image.

In another exemplary aspect, an internal location detector 606 can be employed together with an external GPS service 302 to determine a relevant location of the multi-modal portable communication device 702. Accordingly, this location can be employed in connection with a key component 606 and/or smart home component 606 thereby effecting automation of services such as, but not limited to, remote lock/unlock and ignition of an automobile, unlocking/opening doors, operating appliances, operating lighting devices, etc. In other words, the relevant location of the multi-modal portable communication device 702 can be employed to trigger these (and other) services as a predetermined radius is encroached.

In still another example, multiple image capture devices 606 and/or sensors (not shown) can be employed to provide for stereoscopic capabilities. Additionally, ambient intelligence (e.g., environmental sensors (not shown)), directional speech transmission components (not shown), range/bone sensors (not shown), etc. can be employed to provide a wide range of novel functionalities. By way of example, these functionalities can be combined to assist the blind, effect privacy, consolidate personal items, etc. In yet another example, the multi-modal portable communication device 702 of FIG. 7 can employ a three-dimensional (3D) display to augment industries such as real estate, auction sites, etc.

It will be understood that the examples of consolidating services and pooling of resources are countless. However, it is further to be understood that these additional examples are to be included within the novel functionality of interfacing and consolidating/collaborating services. Thus, the novel functionality of pooling disparate resources from one or more services is to be understood to include the aforementioned as well as any combinations thereof of the services specified (as well as other relevant services).

Additionally, the invention can be employed to regionally organize and/or truncate PIM data (or other data) based on a location. Other aspects exist whereby the invention can infer a target location thus PIM data can be organized and/or truncated accordingly. In one example, this inference can be effected by augmenting the location detection with motion and/or direction sensors such as compasses, accelerometers, etc. Effectively, the invention can provide intelligent assistance to a user by leveraging redundancy and complimentarity of multi-modal information. Therefore, it can be possible to produce significantly better results than if one single modality is used.

Figure 8:
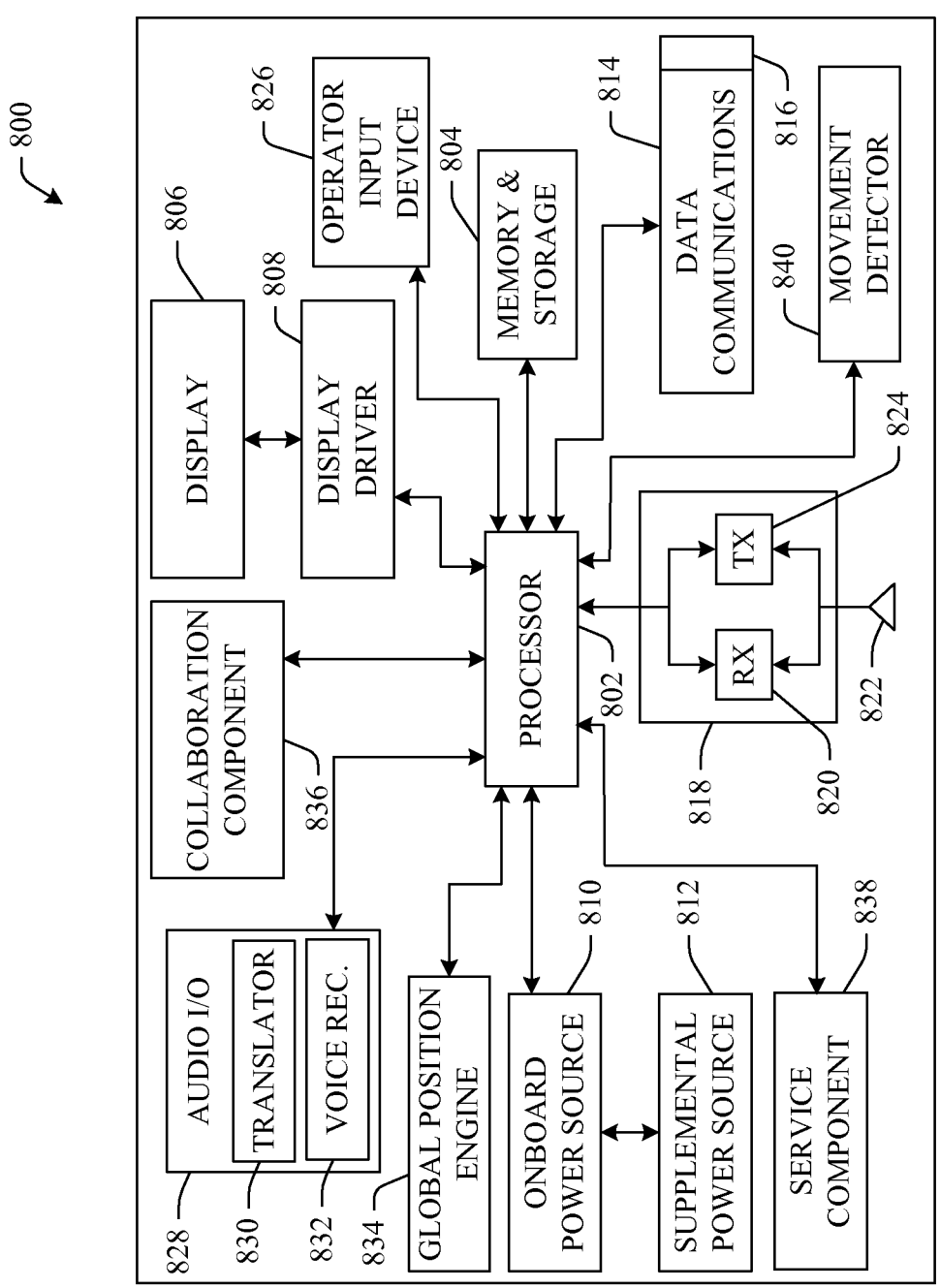
FIG. 8 illustrates an architecture of a multi-modal portable communication device that facilitates collaborating multiple service components in accordance with an aspect.

Referring now to FIG. 8, there is illustrated a schematic block diagram of a portable multi-modal multi-lingual hand-held device 800 according to one aspect of the subject invention, in which a processor 802 is responsible for controlling the general operation of the device 800. The processor 802 can be programmed to control and operate the various components within the device 800 in order to carry out the various functions described herein. The processor 802 can be any of a plurality of suitable processors (e.g., a DSP-digital signal processor). The manner in which the processor 702 can be programmed to carry out the functions relating to the subject invention will be readily apparent to those having ordinary skill in the art based on the description provided herein.

A memory and storage component 804 connected to the processor 802 serves to store program code executed by the processor 802, and also serves as a storage means for storing information such as current locations, inferred target locations, user states, services or the like. The memory and storage component 804 can be a non-volatile memory suitably adapted to store at least a complete set of the information that is acquired. Thus, the memory 804 can include a RAM or flash memory for high-speed access by the processor 802 and/or a mass storage memory, e.g. a micro drive capable of storing gigabytes of data that comprises text, images, audio, and video content. According to one aspect, the memory 804 has sufficient storage capacity to store multiple sets of information, and the processor 802 could include a program for alternating or cycling between various sets of display information.

A display 806 is coupled to the processor 802 via a display driver system 808. The display 806 can be a color liquid crystal display (LCD), plasma display, touch screen display, 3D display or the like. In one example, the display 806 is a touch screen display. The display 806 functions to present data, graphics, or other information content. Additionally, the display 806 can display a variety of functions that are user selectable and that control the execution of the device 800. For example, in a touch screen example, the display 806 can display touch selection icons that facilitate user interaction for control and/or configuration. In another aspect, display 806 is a 3D display that can augment and enhance visual qualities thereby making the visuals more true to form.

Power can be provided to the processor 802 and other components forming the hand-held device 800 by an onboard power system 810 (e.g., a battery pack or fuel cell). In the event that the power system 810 fails or becomes disconnected from the device 800, a supplemental power source 812 can be employed to provide power to the processor 802 (and other components (e.g. sensors, image capture device, ...)) and to charge the onboard power system 810, if a chargeable technology. For example, the alternative power source 812 can facilitate an interface to an external grid connection via a power converter. The processor 802 of the device 800 can induce a sleep mode to reduce the current draw upon detection of an anticipated power failure.

The device 800 includes a communication subsystem 814 that includes a data communication port 816, which is employed to interface the processor 802 with a remote computer, server, service, or the like. The port 816 can include at least one of Universal Serial Bus (USB) and/or IEEE 1394 serial communications capabilities. Other technologies can also be included, but are not limited to, for example, infrared communication utilizing an infrared data port, Bluetooth™, Wi-Fi, Wi-Max, etc.

The device 800 can also include a radio frequency (RF) transceiver section 818 in operative communication with the processor 802. The RF section 818 includes an RF receiver 820, which receives RF signals from a remote device via an antenna 822 and can demodulate the signal to obtain digital information modulated therein. The RF section 818 also includes an RF transmitter 824 for transmitting information (e.g., data, services) to a remote device, for example, in response to manual user input via a user input (e.g., a keypad, voice activation) 826, or automatically in response to the completion of a location determination or other predetermined and programmed criteria.

The transceiver section 818 can facilitate communication with a transponder system, for example, either passive or active, that is in use with location-based data and/or service provider components. The processor 802 signals (or pulses) the remote transponder system via the transceiver 818, and detects the return signal in order to read the contents of the detected information. In one implementation, the RF section 818 further facilitates telephone communications using the device 800. In furtherance thereof, an audio I/O subsystem 828 is provided and controlled by the processor 802 to process voice input from a microphone (or similar audio input device). The audio I/O subsystem 828 and audio output signals (from a speaker or similar audio output device). A translator 830 can further be provided to enable multi-lingual functionality of the device 800.

In another implementation, the device 800 can provide speech recognition 832 capabilities such that when the device 800 is used as a voice activated device, the processor 802 can facilitate high-speed conversion of the voice signals into text or operative commands. For example, the converted voice signals can be used to control the device 800 in lieu of using manual entry via the keypad.

Other devices such as a location detection engine 834 and/or a movement detector (not shown) can be provided within the housing of the device 800 to effect functionality described supra. For example, the location detection engine (e.g., global position engine 834) can be provided to effect the collaboration component 836 to pool resources from services maintained within memory and storage component 804 or in a separate service store 838. In another example, a movement detector 840 can augment the information provided by the location detection engine 834 which further facilitates the processor 802 to infer or predict a target location of the device 800. This target location can be employed by the collaboration component 836 to pool resources of disparate services thus achieving novel functionality of the device 800.

Figure 9:
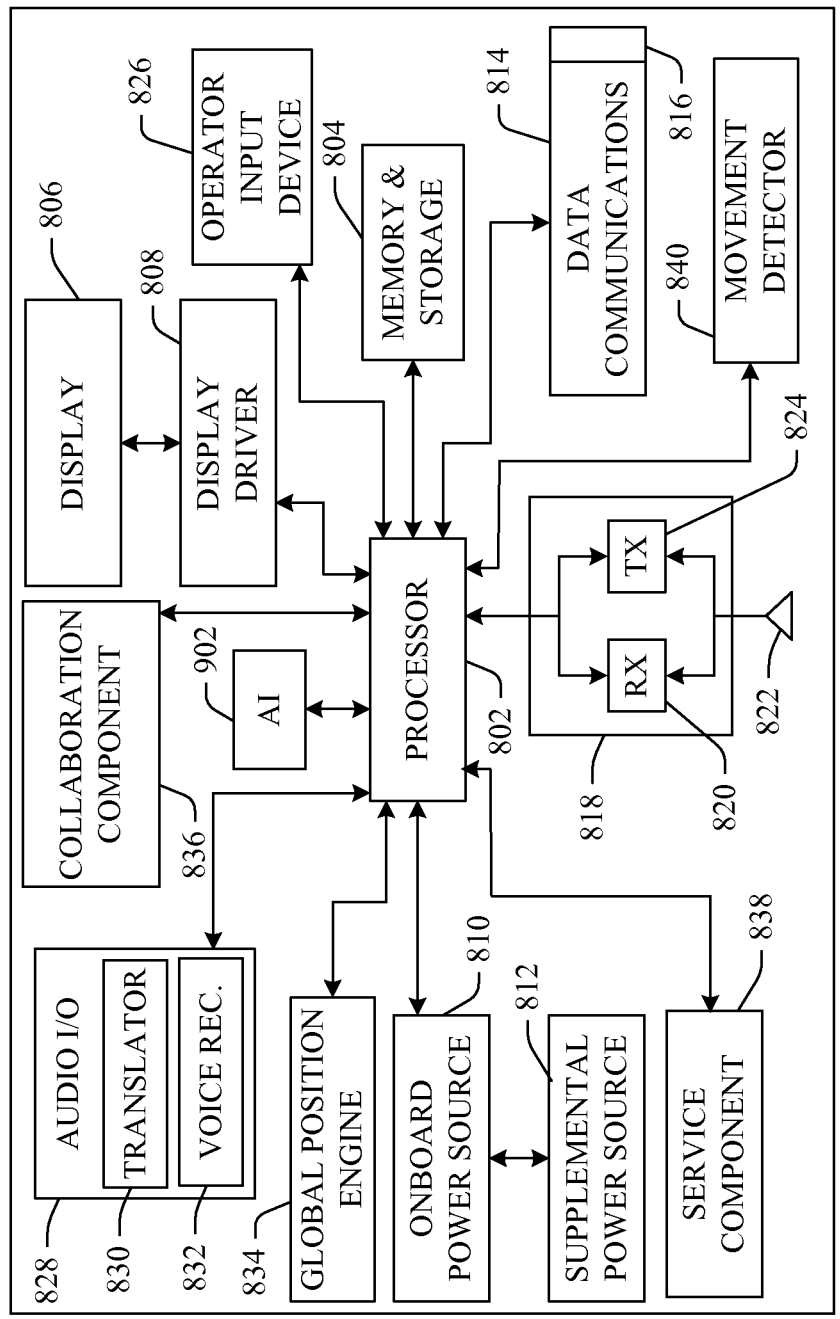
FIG. 9 illustrates an architecture of a portable handheld device including an artificial intelligence-based component that can automate functionality in accordance with an aspect of the invention.

FIG. 9 illustrates a system 900 that employs artificial intelligence (AI) component 902 which facilitates automating one or more features in accordance with the subject invention. The subject invention (e.g. with respect to determining a present or target location, pooling of resources and services, ... ) can employ various AI-based schemes for carrying out various aspects thereof. For example, a process for determining or inferring a target location or for determining a resource to pool can be facilitated via an automatic classifier system and process.

A classifier is a function that maps an input attribute vector, x=(x1, x2, x3, x4, xn), to a class label class(x). A classifier can also output a confidence that the input belongs to a class, that is, f(x)=confidence(x, class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Other classification approaches including but not limited to Naïve Bayes, Bayesian networks, decision trees, neural networks, fuzzy logic models, can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained by using methods of reinforcement learning (e.g. via observing user behavior, observing trends, receiving extrinsic information). Thus, the subject invention can be used to automatically learn and perform a number of functions, including but not limited to determining, according to a predetermined criteria, a present and/or target location, services to pool, when/if to pool resources, which language and/or translation to employ, etc.

Figure 10:
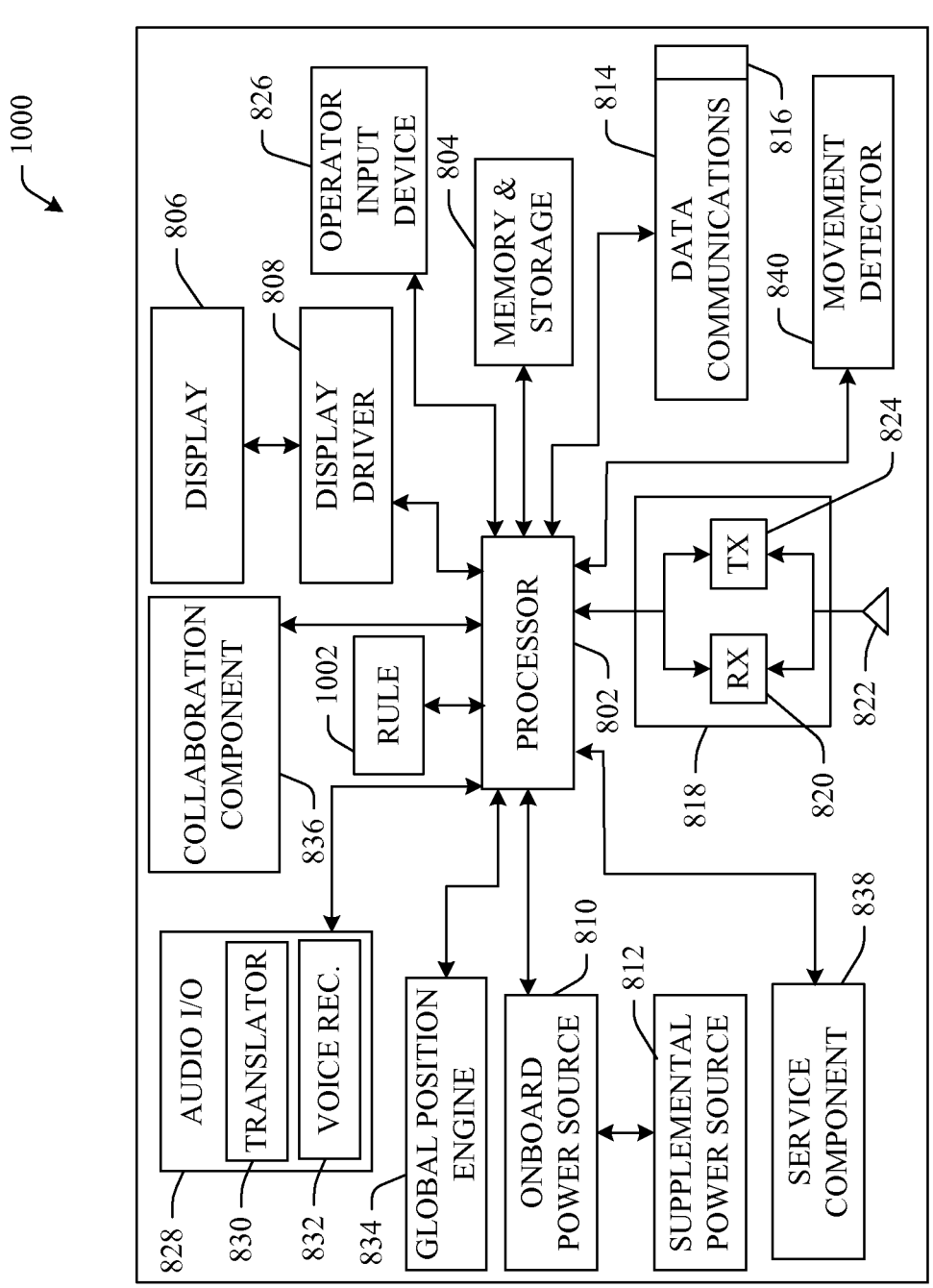
FIG. 10 illustrates an architecture of a portable handheld device including a rules-based logic component that can automate functionality in accordance with an aspect of the invention.

With reference now to FIG. 10, an alternate aspect of the invention is shown. More particularly, handheld device 1000 generally includes a rules-based logic component 1002. In accordance with this alternate aspect, an implementation scheme (e.g., rule) can be applied to define thresholds, initiate service detection, facilitate communication of services, pooling of resources, etc. By way of example, it will be appreciated that the rule-based implementation of FIG. 10 can automatically define criteria thresholds whereby the processor 802 can employ the defined criteria to determine which resources to pool for a given input service. Accordingly, the rule-based implementation can effect collaboration and/or consolidation of services by employing a predefined and/or programmed rule(s) based upon any desired criteria.

It is to be appreciated that any of the specifications and/or functionality utilized in accordance with the subject invention can be programmed into a rule-based implementation scheme. It is also to be appreciated that this rules-based logic can be employed in addition to, or in place of, the AI reasoning components described with reference to FIG. 9.

Figure 11:
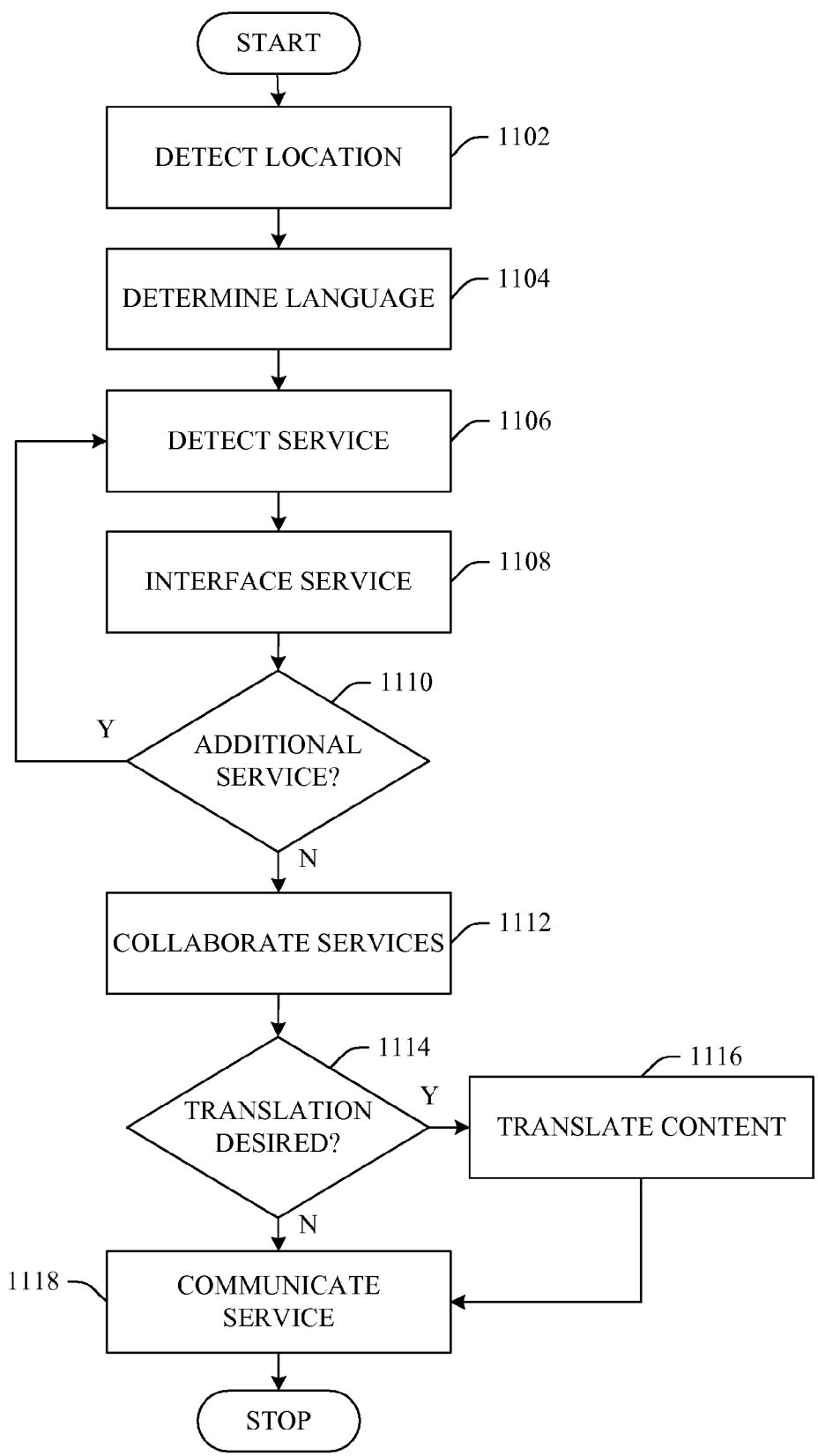
FIG. 11 illustrates an exemplary flow chart of procedures that facilitates translating and/or converting an output of consolidated service components in accordance with an aspect.

Referring now to FIG. 11, a procedure flow of collaborating and/or consolidating services in accordance with a multi-lingual aspect. At 1102, a location is detected. As described supra, the location can be detected via a GPS or other suitable location detector. As well, the location detector can be augmented with a suitable direction and/or motion detector thereby enabling determination and/or inference of a target location. In accordance with a current and/or target location, a relevant language can be determined at 1104. For example, the native language and/or dialect of a geographic region can be determined based in part upon the location detected at 1102.

At 1106, a service is detected. Once detected, at 1108, the service can be interfaced into the client device. Client devices can included, but are not limited to, cellular telephones, PDAs, smartphones, pocket computers, notebook and laptop computers or other portable devices.

At 1110, a determination is made if an additional service is available to be interfaced into the host device. If an additional service is available, the system returns to 1106 thus interfacing the additional service. Once all services are interfaced, the services are collaborated and/or consolidated at 1112. In collaborating and/or consolidating services, disparate resources can be pooled thus establishing functionality that draws upon multiple services as described above.

A determination is made if translation is desired (or appropriate) at 1114. If translation is desired (or appropriate), the content is translated at 1116. This determination can be made by comparing the language of the service output from the collaboration to the language determined at 1104. Once the translation is effected or if a translation not desired, the service is communicated to a user and/or application at 1118.

Figure 12:
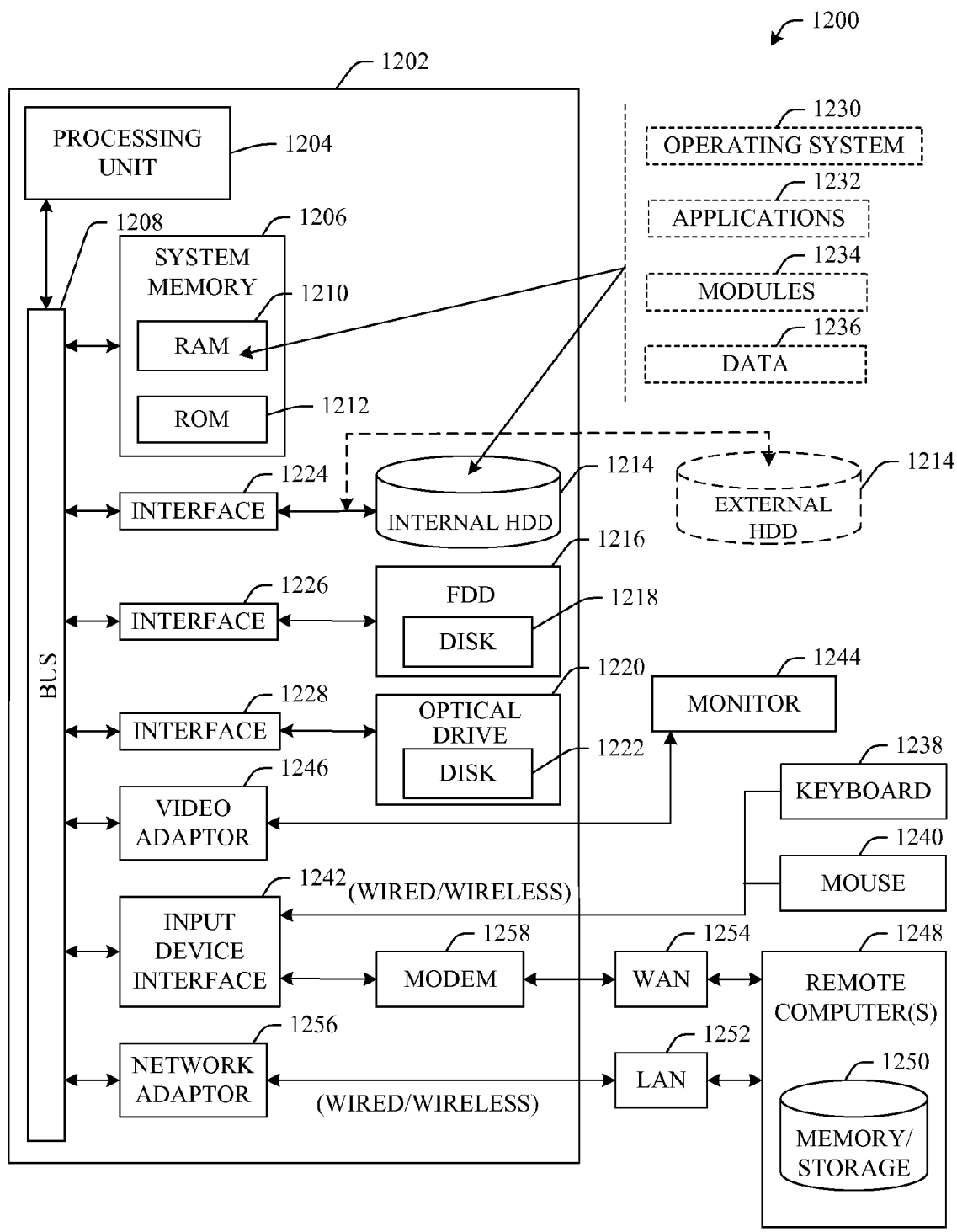
FIG. 12 illustrates a block diagram of a computer operable to execute the disclosed architecture.

The aforementioned functionality can be employed within any computing device including, but not limited to, a cellular telephone, smartphone, pocket computer, laptop computer, PDA or the like. Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g. a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g. a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
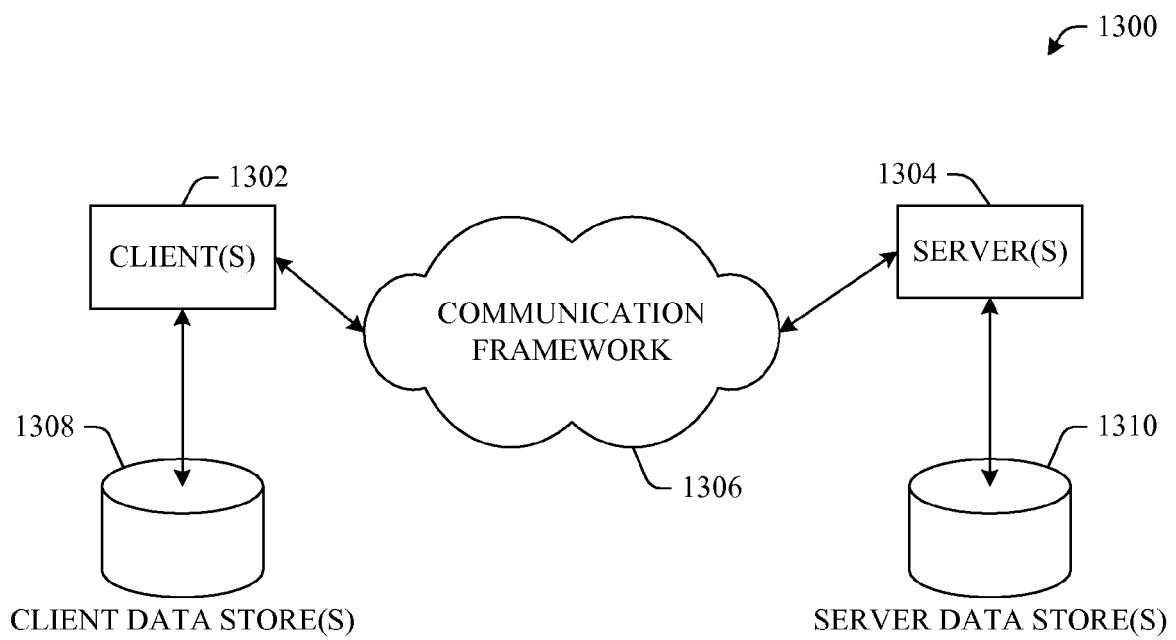
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. As illustrated in FIG. 13, it is to be understood that the "client(s)" can be representative of a portable device and the "server(s)" can be representative of a host computer or other disparate portable device. As shown, the system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device comprising:
an interface component that communicates with a first service and a second service to effect interaction of the first service and the second service via the mobile device;
a collaboration component that provides functionality to the mobile device using at least a first resource from the first service and a second resource from the second service, the first resource and the second resource being used to infer an action to be automatically performed by employing a third service that is external to the mobile device.

2. The mobile device of claim 1, wherein the first service and the second service are remote to the interface component, and wherein the interface component wirelessly communicates with the first service and the second service.

3. The mobile device of claim 2, further comprising a detection component that senses the first service and the second service in a wireless communication range of the mobile device.

4. The mobile device of claim 3, wherein the wireless communication range is based at least in part upon one of an infrared, Bluetooth™, cellular, and Wi-Fi wireless transmission protocol.

5. The mobile device of claim 1, further comprising a multi-language component that translates an output from at least one of the first service and the second service from a first language into a second language.

6. The mobile device of claim 1, wherein the collaboration component joins the third service to at least one of the first service and the second service.

7. The mobile device of claim 1, wherein the first service includes at least one of a remote control component, an image capture component, a location detector, a personal information manager (PIM) component, a smart home component and an electronic pen.

8. The mobile device of claim 7, wherein the second service includes at least one of a key component, an audio recorder component, a health monitor component, a gaming component, an optical mouse and a motion detector.

9. The mobile device of claim 8, further comprising a multi-language component that converts an output from one of the first and the second service into a language associated with a location.

10. The mobile device of claim 1, further comprising a scanner component that facilitates scanning an image and an image processing engine that recognizes a symbol in the image and converts the symbol into a text file in a pre-defined format that facilitates interaction with the mobile device, wherein the symbol is at least one of an alphabetical character, a numerical character, a bar code and a shape.

11. The mobile device of claim 10, further comprising a multi-language component that converts the text file from a first language into a second language.

12. The mobile device of claim 11, further comprising a text-to-speech engine that converts the text file into an audible file.

13. The mobile device of claim 1, further comprising an artificial intelligence component that infers the action to be automatically performed.

14. The mobile device of claim 1, further comprising a rules-based logic component that automates collaboration of the first service and the second service based at least in part upon a predefined rule.

15. A storage memory having stored thereon computer-executable instructions for carrying out the mobile device of claim 1.

16. A computer-implemented method of consolidating services in a multi-modal, multi-lingual mobile communication device, comprising:
determining a location of the multi-modal, multi-lingual mobile communication device;
determining a language comprehendible to a user based at least in part upon the location;
interfacing a first service into the multi-modal, multi-lingual mobile communication device;
interfacing a second service into the multi-modal, multi-lingual mobile communication device; and
automatically collaborating at least one resource of the first service with at least one resource of the second service, the multi-modal, multi-lingual mobile communication device facilitates employment of collaborated resources in the language comprehendible to the user.

17. The computer-implemented method of claim 16, further comprising wirelessly detecting the first service and the second service in a wireless communication range of the multi-modal, multi-lingual mobile communication device.

18. The computer-implemented method of claim 17, further comprising translating at least one of the collaborated resources into the language from another language.

19. A computer storage memory storing instructions that enable a processor of a portable communication device to perform operations comprising:
wirelessly detecting an external service in communication with the portable communication device;
detecting an internal service of the portable communication device;
providing a functionality using at least one resource of the external service and at least one resource of the internal service; and
accessing the functionality of the used resources of the external and internal services to infer an action to be automatically performed via the portable communication device.

20. The computer storage memory of claim 19, wherein the operations further comprise converting speech corresponding to at least one of the collaborated resources into a language associated with a location.

* * * * *